Patented Oct. 11, 1938

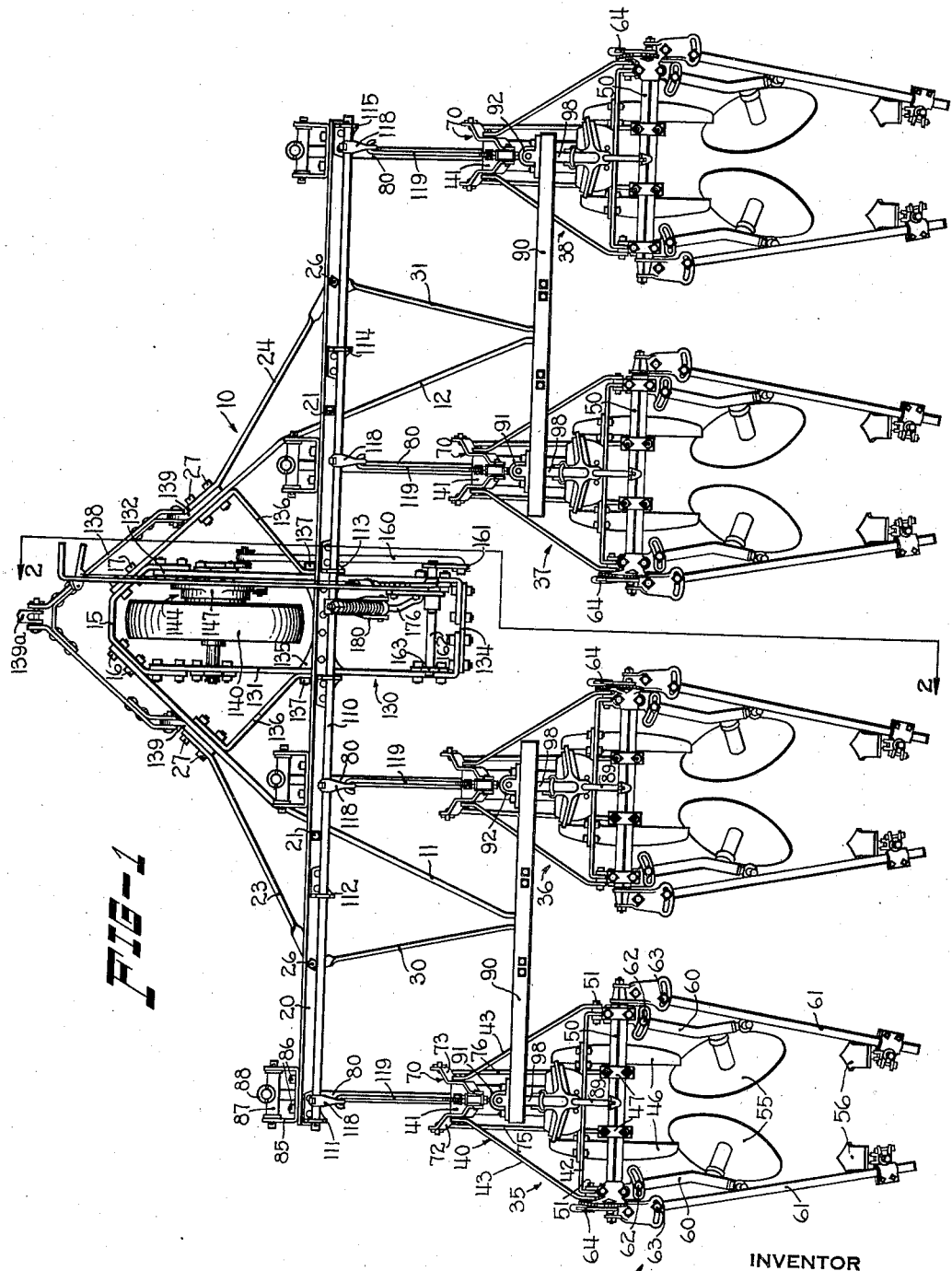

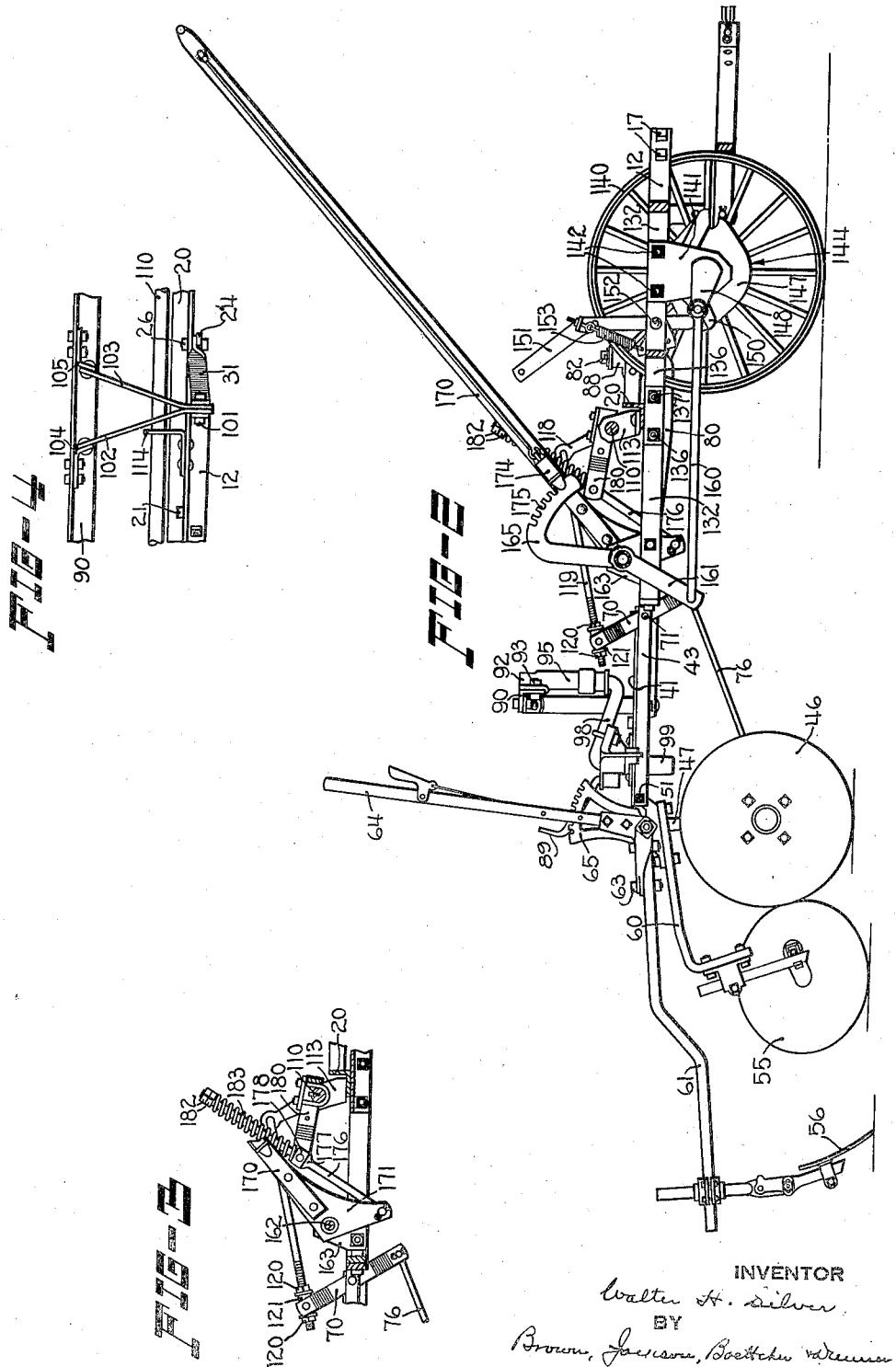

2,132,762

UNITED STATES PATENT OFFICE 2,132,762

CULTIVATOR

Walter H. Silver, Moline, Ill., assignor to Deere & Company, Moline, Ill., a corporation of Illinois Application April 22, 1936, Serial No. 75,716
Renewed July 3, 1937

42 Claims. (Cl. 97—143)

The present invention relates to agricultural machines and is particularly concerned with lister cultivators and similar implements in which a plurality of independently movable cultivator gangs or units are provided.

One of the principal objects of the present invention is the provision of a lister cultivator having a fore-truck for supporting the forward end of the machine, the rear end being supported on the cultivator gangs or trucks. Another object of the present invention in this connection is the provision of power lift mechanism associated with the fore-truck wheel for raising and lowering the lister tools.

A further object of the present invention is the provision of a lister cultivator which is supported as a complete unit on wheels, whether at work, being transported, or simply standing idle, and a further object of the present invention in this connection is the provision of a vertically flexible hitch connection between the implement and the tractor.

An additional object of the present invention is the provision of stabilizing or equalizing bars, particularly where four gangs or units are employed, which are so constructed and arranged as to support the frame weight at the rear of the machine by distributing the weight equally to all four of the units, resulting in the work of all of the gangs or units being uniform.

A further object of the present invention is the provision of an implement employing two pairs of cultivator gangs that are alined transversely and which are not only spaced apart but also have relatively long draft links whereby the machine easily accommodates deviations in the row spacing.

These and other objects and advantages of the present invention will be apparent to those skilled in the art after a consideration of the following detailed description of the preferred embodiment, taken in conjunction with the accompanying drawings illustrating such embodiments.

In the drawings:

Figure 1 is a plan view of a machine embodying the principles of the present invention;

Figure 2 is a view, with certain parts shown in section, taken substantially along the plane of the line 2—2 of Figure 1;

Figure 3 is a fragmentary view showing a detail of the manual adjusting means and the yielding connection between the tools and power lift controlled rock shaft; and Figure 4 is a fragmentary view illustrating one of the supports suspending the rear end of the main frame from the stabilizing or equalizing bars for the gangs or units.

Referring now to the drawings, the reference numeral 10 indicates the main frame of the machine. The main frame 10 consists of a pair of generally longitudinally extending frame bars 11 and 12 that converge forwardly at the forward ends and diverge rearwardly. The frame bars 11 and 12 are connected together at their ends by a U-shaped member 15 which is connected by bolts 16 and 17 to the frame bars 11 and 12. Disposed across and rigidly secured to the frame bars 11 and 12 is a transverse draft bar 20 which is bolted, as at 21, to the frame bars 11 and 12 intermediate the ends thereof and which extend laterally outwardly thereof. Suitable brace bars 23 and 24 are connected by bolts 26 to the transverse draft bar at points laterally outwardly of the frame bars 11 and 12, the forward ends of the brace bars 23 and 24 being bolted as at 27 to the frame bars 11 and 12 adjacent their forward ends. Additional brace bars 30 and 31 are fastened at their forward ends to the transverse draft bar 20, preferably by means of the bolts 26, and the rear ends of the brace bars 30 and 31 are disposed to lie closely adjacent to the rearmost end portions of the frame bars 11 and 12, as best indicated in Figures 1 and 4.

Two pairs of cultivator gangs or units, indicated at 35, 36, 37 and 38, respectively, are pivotally connected in draft receiving relation with the transverse draft bar 20. The particular construction of each of the cultivator units 35, 36, 37 and 38 is quite similar to the lister cultivator units shown in the patent to Wesley A. Paul, No. 1,148,613, issued August 3, 1915, and the lister cultivator units shown in the patent to Theophilus Brown et al., No. 1,928,307, issued September 26, 1933. In the preferred form of the present invention, each of the lister cultivator units consists of a truck frame 40 which comprises a longitudinally disposed channel member 41, a transverse bar 42 and suitable braces 43. Each of the cultivator gangs is supported upon a pair of bell wheels 46 which are journaled on the laterally out-turned ends of standards 47 which at their upper ends are bolted to a squared shaft 50 pivotally connected, as at 51, to the truck frame 40 for tilting movement. Also secured to the squared shaft 50 are soil working tools of any suitable type. Usually, disks 55 and shovels 56 are provided, being mounted on rearwardly extending tool bars 60 and 61, respectively, bars 60 being adjustably secured, as at 62, to the squared shaft 50 in any suitable manner and the bars 61 being adjustably fixed, as at 63, to a round shaft mounted within the square shaft 50 and fixed in adjusted position by a hand lever 64 fixed to the round shaft and cooperating with a sector 65 secured to the square shaft 50.

The tools 55 and 56 are raised and lowered together out of and into operating position by swinging or tilting the wheel standards 47 in a generally fore and aft direction, and this is accomplished by means of a lever 70 (Figure 2) pivoted as at 71 to the forward end of the truck frame channel 41, and preferably the pivoted member 70 consists of two strap members 72 and 73 (Figure 1) to the lower ends of which links 75 and 76 are connected, the rear ends of the links 75 and 76 being pivoted to the lower ends of the wheel standards 47 so that by swinging the member 70 in a fore and aft direction the wheel standards are swung about their pivot axis 51 to raise and lower the tools 55 and 56. A draft link 80 is rigidly secured at its rear end to the truck frame channel 41 and is a relatively long member that is provided at its forward end with an upturned portion 82. A bracket 85 is bolted, as at 86, to the forward vertical flange of the transverse draft bar 20 and pivotally receives a pivot member 87 (Figure 1) which has a vertical sleeve portion 88 in which the upturned end 82 of the draft link 80 is journaled. By virtue of this construction, the cultivator unit may swing laterally, and also vertically, with respect to the transverse draft bar 20 and the other cultivator units. A hook 89 is provided adjacent the rear of the frame channel 41 to support a shield (not shown). Since each of the cultivator gangs or units is constructed in the same way, the above description of one of the units will suffice.

Suitable equalizing means is provided for holding the units in proper upright position, and such equalizing bar means is connected with the units so as to accommodate their lateral swinging movement. Referring now more particularly to Figures 1 and 2, the equalizing bar for the left hand pair of cultivator units 35 and 36 is indicated by the reference numeral 90 and comprises an angle member disposed transversely of the machine and carrying brackets 91 and 92 secured at the opposite ends of the member 90 by bolts 93 (Figure 2). Each of the brackets 91 and 92 includes a long vertical sleeve section 95 in which the upper spindle end of a stabilizing hanger arm 98 is received. Each of the stabilizing hanger arms 98 is formed as a Z-section and includes a lower spindle end disposed in a long bearing sleeve or socket 99 fixed to the associated truck frame, as best shown in Figure 2. By virtue of this construction, the equalizer bar 90 is pivotally connected to the two associated cultivator gangs in such a way that the bar 90 serves to hold the gangs in their upright position while, at the same time, accommodating any lateral swinging of one with respect to the other that may take place. The rear ends of the frame members 11 and 39 are connected by a pivot bolt 101 (Figure 4) to the lower ends of links 102 and 103 which are pivoted at their upper ends to brackets 104 and 105 bolted or otherwise secured to the equalizer bar 90. The frame bars 12 and 31 are similarly swung from the equalizer bar 90 at the other side of the machine. Thus, the rear end of the frame is carried on the four cultivator gangs but without interfering with their independent movement. The two cultivator gangs at the other side of the machine are connected together by stabilizing means of the same construction, and hence no further description is necessary. The hanger arm construction, and especially the connection with the truck frames of the cultivator gangs, is quite similar to the construction shown and claimed in my prior Patent No. 1,928,320, issued September 26, 1933.

As mentioned above, the lister tools are raised and lowered by swinging the bell wheel standards 47 fore and aft. According to the principles of the present invention, the tools of both pairs of cultivator gangs are raised and lowered simultaneously. A long rock shaft 110 is journaled for rocking movement on the transverse draft bar 20 and is supported thereon by a plurality of brackets 111, 112, 113, 114 and 115 which are riveted or otherwise secured to the horizontal flange of the angle bar 20. At spaced points along the rock shaft 110 and substantially directly above the draft links 80 for the various cultivator units are arms 118 which are securely fixed to the rock shaft 110 so as to swing therewith, and extending rearwardly from each of the arms 118 is an operating rod 119 having a hook at its forward end pivotally received in a hole in the outer end of the associated rock shaft arm 118, and the rear end of each of the operating rods 119 is threaded, as best shown in Figure 2, and has a pair of lock nuts 120 thereon securely tightened against a trunnion block 121 pivoted to the upper ends of the strap members 72 and 73 constituting the pivoted member 70 that controls the fore and aft swinging of the bell wheel standards 47 through the lower links 75 and 76. Since each of the cultivator units includes the above construction, it will be seen that rocking movement of the shaft 110 raises and lowers all of the lister tools at the same time.

The rock shaft 110 is preferably operated by a power lift mechanism operated from the fore wheel supporting the front end of the machine in the preferred form of construction, although the present invention contemplates a hand lift, if desired. A sub-frame 130 is provided on the main frame 10 and includes a pair of longitudinal bars 131 and 132 bolted to the rear ends of the frame member 15 and connected together at their rear ends by a strap member 134. The sub-frame members 131 and 132 are also rigidly fastened to the central portion of the transverse draft bar 20 by any suitable means, preferably by bracket means 135 to which the rear ends of brace members 136 are bolted, as at 137 (Figure 2). A hitch member 138 is pivoted to brackets 139 fastened to the frame of the machine by the bolts 27, and provides for a flexible draft connection with the tractor draw bar 139a or the equivalent to which the member 138 is pivoted.

A front wheel 140 is journaled in brackets 141 (Figure 2) bolted, as at 142, to the sub-frame members 131 and 132, the wheel 140 and associated frame parts constituting a fore-truck which carries the weight of the implement at the front. Suitable power lift meshanism 144 is provided on the wheel 140. The present invention is not concerned with the particular details per se of the power lift mechanism so that all of the parts have not been shown in the drawings. It is sufficient to note, however, that the power lift mechanism 144 follows the conventional form in that the mechanism includes an intermittently rotatable part 147 to which a crank arm 148 is fixed, the intermittently rotatable part 147 being controlled by a latch 150 which, in turn, is controlled by a tripping lever 151 pivoted at 152 to the sub-frame member 132. When the trip lever 151 is swung forwardly from the position shown in Figure 2, the lower end thereof clears the latch lever 150, permitting the clutch dog of the power lift mechanism to engage a constantly rotating part driven by the wheel 140, thus rotating the crank arm 148. The crank arm 148 is connected by means of a link 160 to the rear end of an arm 161 that is fixed to a rock shaft 162 journaled in brackets 163 carried on the rear end of the sub-frame 130. A sector 165 is also fixed to the rock shaft 162.

An adjusting lever 170 (Figure 2) includes a bell crank portion 171 (Figure 3) that is journaled for rocking movement on the rock shaft 162, and the lever 170 is provided with detent latch mechanism 174 which is adapted to engage in one of the notches 175 formed on the sector 165 so as to hold the lever in any adjusted position. The lower end of the bell crank portion 171 of the lever 170 is pivotally connected to a rod 176 that extends upwardly and has an enlarged shouldered section 177 that engages a trunnion collar 178 pivoted to the outer end of an arm 180 which is fixed to the central portion of the rock shaft 110. The rod 176 extends upwardly through the collar 178 in slidable relation and at its upper end carries a pair of nuts 182. A compression spring 183 is disposed about the upper end of the link 176 and is held between the trunnion collar 178 pivoted to the lever 180 and the nuts 182 carried at the upper end of the link or rod 176.

In operation, when the power trip lever 151 is actuated the power lift mechanism causes the crank arm 148 to turn with the wheel 140, and when the parts are disposed in operating position, as shown in Figure 2, the forward rolling of the wheel 140 causes a pull on the link 160. This swings the rock shaft 162 in a counter-clockwise direction, carrying with it the lever 170 which is latched to the sector 165. The movement of the bell crank end 171 of the lever exerts a thrust upwardly through the rod 176 against the outer end of the arm 180, and this in turn, rocks the rock shaft 110 in a clockwise direction as viewed in Figure 2. The rocking movement of the shaft 110 in this direction exerts a pull on all of the connecting links 119 and thus swings the pivoted members 70 of all of the cultivator units. The movement of the levers 70 in this direction exerts a rearward thrust on the links 75 and 76, thus swinging the bell wheel standards 47 rearwardly and raising the tools 55 and 56 out of operating position and arranging the four cultivator units for transport. At this point, the other end of the latch lever 150 engages the lower end of the tripping lever 151, which has been restored to its original position by the spring 153, and this disconnects the power lift mechanism and holds the crank arm 148 in a position substantially 180 degrees fom the position shown in Figure 2. By virtue of this means the tools are held in their raised position. When it is desired to again place the machine in operation, the trip lever 151 is again actuated, and the power lift mechanism causes the rotation of the wheel 140 to swing the crank arm 148 from its forward position back into the position shown in Figure 2, thus restoring the parts to the position shown in the latter figure. In this movement it is to be noted that the clockwise rotation of the lower end of the lever 170 exerts a thrust on the outer end of the arm 180 through the compression spring 183. Thus, the yielding of the spring 183 permits the power lift mechanism to move into its operating position without straining or breaking any of the parts in case the tools 55 and 56 do not enter the ground to their full depth of operation immediately. Individual adjustment of the pairs of shovels 56 may be effected by moving the levers 64 to different positions.

From the above description it will be apparent that the machine embodying the principles of the present invention possesses many advantages over the machines of the prior art. By having the front end of the machine supported on a fore-truck, the cultivator is a complete unit supported on its own wheels, whether in operating position or in transport position, or if the machine is merely standing idle. Also, by virtue of the fore-truck construction, a hitch which is flexible vertically is made possible, and by using a hitch of this character, connecting the implement to a tractor may be quickly and easily accomplished without having to lift any weight of the cultivator itself. Also, no portion of the weight of the machine is carried on the tractor, nor does any vertical movement of the tractor relative to the implement by reason of uneven or rough ground effect the operation of the implement itself. The use of a wheel supported front or fore-truck makes it possible to employ to power lift arrangement, and by virtue of this construction the machine need not be stopped at the end of the field in raising or lowering the tools, as is necessary in the case of a hand-lift implement.

While the weight of the front end of the implement is supported on the fore-truck, the equalizing bars 90 support the frame weight at the rear, distributing the weight equally to all four of the cultivator gangs, but this is accomplished without interfering with the independent movement of the individual cultivator units. Thus, in operation the cultivating work of all of the gangs is the same at all times, independent of any irregularities of the ground or in the furrow spacing. It is also to be noted that all four of the cultivator gangs are aligned transversely of the machine and that they are connected individually through the transverse draft bar by relatively long draft links. This adds to the ability of the machine to accommodate crooked or variable row widths. The radius of swinging movement of the individual cultivator units being relatively long, the bell wheels and tools follow the harrow trench regardless of variations while at the same time maintaining the disks and shovels in proper position relative to the planted rows.

While I have thus shown and described above the preferred form of construction in which the principles of the present invention have been embodied, it is to be understood that my invention is not to be limited to the specific details shown and described above, but that, in fact, widely different means may be employed in the practice of the broader aspects of my invention.

What I claim, therefore, and desire to secure by Letters Patent is:

1. A lister cultivator comprising a frame including generally longitudinally extending frame bars, a transverse draft bar secured thereto adjacent the forward ends thereof, two pairs of cultivator units pivotally connected at their forward ends with said draft bar for lateral swinging movement, a transverse stabilizing bar pivotally connected with the units of each pair for maintaining the units in upright position while accommodating their lateral swinging movement, and means supporting the rear ends of said frame bars on said stabilizing bars.

2. A lister cultivator comprising a frame including generally longitudinally extending frame bars, a transverse draft bar secured thereto adjacent the forward ends thereof, two pairs of cultivator units pivotally connected at their forward ends with said draft bar for lateral swinging movement, a transverse stabilizing bar pivotally connected with the units of each pair for maintaining the units in upright position while accommodating their lateral swinging movement, and a fore and aft swinging link means disposed between the units of each pair and pivotally suspending the rear end of the associated longitudinally extending frame bar from the stabilizer bar for the unit.

3. A lister cultivator comprising a generally V-shaped frame including frame bars diverging rearwardly, draft means connected with the forward converging ends of said frame bars, a transverse draft bar rigidly secured to said frame bars intermediate the ends thereof, two pairs of cultivator units pivotally connected at their forward ends with said transverse draft bar for lateral swinging movement, said units being disposed on opposite sides of the rear ends of said frame bars, a transverse stabilizing bar pivotally connected with the units of each pair for maintaining the units in upright position while accommodating their lateral swinging movement, and means suspending the rear ends of said frame bars on said stabilizing bars.

4. A lister cultivator comprising a frame including a pair of rearwardly diverging frame bars, a transverse draft bar rigidly secured to said frame bars intermediate the ends of the latter and extending laterally outwardly thereof, and a pair of brace bars at each side of the cultivator secured to said draft bar and said rearwardly diverging bars at points fore and aft of said draft bar, two pairs of cultivator gangs having forwardly extending draft links pivotally connected to said draft bar and extending rearwardly therefrom on opposite sides of the rear ends of said frame bars, two stabilizing bars pivotally connected to the cultivator gangs of each pair and serving to maintain each of said gangs in upright position, and downwardly depending link means suspended from each of said stabilizing bars and pivotally connected at its lower end with the rear ends of said rearwardly diverging frame bars and the rear brace bars.

5. A lister cultivator comprising a frame including generally longitudinally extending frame bars, a transverse draft bar secured thereto adjacent the forward ends thereof, two pairs of cultivator units pivotally connected at their forward ends with said draft bar for lateral swinging movement, a transverse stabilizing bar pivotally connected with the units of each pair for maintaining the units in upright position while accommodating their lateral swinging movement, means supporting the rear ends of said frame bars on said stabilizing bars, a rock shaft mounted for rocking movement on said transverse draft bar, adjusting mechanism for each of said units operatively connected with said rock shaft, and means supported at the forward ends of said generally longitudinally extending frame bars for operating said rock shaft.

6. A lister cultivator comprising a frame including generally longitudinally extending frame bars, a transverse draft bar secured thereto adjacent the forward ends thereof, two pairs of cultivator units, each of said units including a truck frame, soil working tools adjustably connected therewith and a forwardly extending draft link rigidly connected with the truck frame and pivotally connected at its forward end to said transverse draft bar for lateral swinging movement, a transverse equalizing bar pivotally connected with the truck frames of each pair of units for maintaining the latter in upright position while accommodating their lateral swinging movement, means supporting the rear ends of said longitudinally extending frame bars on said equalizing bars, and adjusting mechanism for said units including a rock shaft mounted on said transverse draft bar and rearwardly extending links disposed alongside the draft bars for said units.

7. A lister cultivator comprising a frame including generally longitudinally extending frame members and a transverse draft bar rigidly carried by said frame members intermediate the ends of the latter, a plurality of cultivator units, each including a truck frame, tiltably mounted wheels, a longitudinally extending draft bar rigidly connected with said truck frame and pivotally connected with said transverse draft bar for lateral swinging movement, and a member pivotally mounted on said truck frame and operatively connected with said wheels for controlling the position thereof, equalizing bar means for said units and accommodating the lateral movement of the latter, means connecting the rear ends of said frame bars with said equalizing bar means, a rock shaft journaled on said transverse draft bar, means for rocking said rock shaft, and means operatively connecting said rock shaft with the pivotally mounted member on each of said truck frames.

8. A lister cultivator comprising generally longitudinally extending frame bars, a transverse draft bar rigidly secured to said frame bars intermediate the ends thereof, a plurality of cultivator units, each including a truck frame, tiltably mounted wheels supporting the same, a tilting lever pivotally mounted on the truck frame and operatively connected with said wheels, and a draft link rigidly connected to the truck frame and pivotally connected to said transverse draft bar, stabilizing bar means pivotally connected with the truck frames of said units and operatively connected to support the rear ends of said longitudinal frame bars, a rock shaft journaled on said transverse draft bar and operatively connected with the pivoted member on each of said truck frames, whereby actuation of said rock shaft adjusts the position of the wheels of all of said units, a sub-frame rigidly connected to said transverse draft bar, and an adjusting lever mounted on said sub-frame and operatively connected with said rock shaft for controlling the position of said truck frame supporting wheels.

9. A lister cultivator comprising a frame including generally longitudinally extending rearwardly diverging frame bars, a transverse draft bar secured to said frame bars intermediate their ends and extending laterally outwardly thereof, a plurality of cultivator gangs in transverse alinement and each including a wheel supported truck frame and a longitudinally extending draft link rigidly secured thereto at its rear end and pivotally connected at its forward end with said transverse draft bar for lateral swinging movement, and equalizer bar means operatively connected with the rear ends of said frame bars and pivotally connected with the truck frames of said units.

10. A lister cultivator comprising a frame including generally longitudinally extending frame bars, a transverse draft bar secured thereto intermediate the ends of said frame bars, two pairs of cultivator units, said units being disposed in transverse alinement and each including a wheel supported truck frame and a relatively long draft link rigidly secured at its rear end to the associated truck frame and pivotally connected to said transverse draft bar, the two units at each side of the cultivator being disposed on opposite sides of the rear end of the associated longitudinally extending frame bar, an equalizing bar pivotally connected with the units of each pair for maintaining the latter in upright position, and means suspending the rear end of each of said frame bars from the associated equalizing bar.

11. A lister cultivator comprising a frame including a generally transverse draft bar, a ground supported fore-truck connected with the forward portion of said frame, a plurality of lister gangs pivotally connected with said transverse draft bar for lateral swinging movement, equalizer bar means connected with said lister gangs, and means supporting the rear end of said frame from said equalizer bar means.

12. A lister cultivator comprising a frame including a generally transverse draft bar, a ground supported fore-truck connected with the forward portion of said frame, a plurality of lister gangs pivotally connected with said transverse draft bar for lateral swinging movement, equalizer bar means connected with said lister gangs, means supporting the rear end of said frame from said equalizer bar, a rock shaft journaled on said transverse draft bar, means connecting each of said gangs with said rock shaft, and power lift mechanism actuated from said fore-truck for rocking said rock shaft.

13. A lister cultivator comprising a frame, a ground supported fore-truck connected with the forward portion of said frame, a plurality of lister gangs pivotally connected with said frame, and means supporting the rear end of said frame on said gangs.

14. In a tractor lister cultivator, a plurality of cultivator gangs, a front supporting wheel, a draft frame adapted to be supported at its front end on said wheel, means supporting the rear portion of said draft frame on said gangs, means connecting the gangs to the draft frame, and power lift mechanism associated with said gangs and operated by said wheel.

15. In a tractor lister cultivator comprising a plurality of cultivator gangs, each gang having vertically movable ground-working tools associated therewith, a front supporting wheel, a draft frame adapted to be supported at its front end on said wheel, means supporting the rear portion of said draft frame on said gangs, means pivotally connecting the gangs to the draft frame, and means for controlling the position of the tools of said gangs relative to the ground, including a power lift clutch associated with and operated by said wheel.

16. A lister cultivator comprising a generally V-shaped frame including rearwardly diverging frame bars, a transverse draft bar rigidly secured to said frame bars intermediate the ends of the latter and extending laterally outwardly thereof, two pairs of cultivator units pivotally connected at their forward ends to said transverse frame bar in spaced transverse alinement and for lateral swinging movement with respect to each other, an equalizing bar pivotally connected with the two units at each side of the cultivator, means suspending the rear ends of said frame bars, each of said units including ground engaging tool means adapted to be raised and lowered, a rock shaft journaled on said transverse frame bar and operatively connected with the ground working tools of each of said units, wheel means disposed forwardly of said transverse draft bar and serving to support the front end of said cultivator, and power lift mechanism operated from said wheel and operatively connected to actuate said rock shaft.

17. A lister cultivator comprising a frame including generally longitudinally extending frame bars converging forwardly, a transverse draft bar secured thereto adjacent the forward end thereof, a ground engaging supporting wheel journaled for rotation on said frame forwardly of said draft bar and between the forwardly converging portions of said frame bars, a plurality of wheel supported cultivator units pivotally connected with said transverse draft bar for lateral swinging movement, said units including soil engaging tools adapted to be raised and lowered, means for raising and lowering said tools including a rock shaft journaled on said transverse draft bar and rearwardly extending links connected between said rock shaft and the soil engaging tools of each unit, power lift mechanism actuated by said supporting wheel, and manually adjustable means connecting said power lift mechanism with said rock shaft.

18. A lister cultivator comprising a generally V-shaped frame including rearwardly diverging frame bars, a transverse draft bar secured intermediate the ends of said frame bars, a plurality of cultivator gangs pivotally connected with said transverse draft bar for lateral swinging movement, equalizing bar means connected with each of said cultivator gangs for holding them in upright position, means suspending the rear ends of said frame bars from said equalizing bar means, a ground engaging supporting wheel journaled on the forward portion of said frame forwardly of said transverse frame bar, a sub-frame carried by said transverse frame bar, a rock shaft journaled on said sub-frame, power lift mechanism actuated by said ground engaging supporting wheel, means connecting said rock shaft to lift said power lift mechanism to be actuated thereby, a transverse rock shaft journaled on said transverse draft frame and operatively connected with said units for moving the same into and out of operating position, and manually adjustable mechanism operatively connecting said rock shafts.

19. A lister cultivator comprising a main frame having rearwardly diverging frame bars and a transverse draft bar rigidly secured to said frame bars and extending laterally outwardly therefrom, a plurality of cultivator units, each of said units including a wheel supported truck frame, generally vertically adjustable soil engaging tool means mounted on said truck frame, means for adjusting the position of said tools including a member pivotally connected to said truck frame and operatively connected at its lower end with said tools for raising and lowering the same, and a draft link rigidly connected to said truck frame and pivotally connected to said transverse draft bar for laterally swinging movement, equalizer bar means operatively supporting the rear ends of said frame bars on said units, a sub-frame securely fixed to the forward converged ends of said frame bars and to said transverse draft bar, said sub-frame extending rearwardly of the latter, a ground engaging wheel journaled in the forward portion of said sub-frame and having power lift mechanism associated therewith, a rock shaft mounted for rocking movement on said transverse draft bar, adjustable link mechanism operatively connecting said rock shaft with the upper end of each of the pivoted adjusting members carried on said truck frames, a second rock shaft journaled for movement adjacent the rear end of said sub-frame and operatively connected with said power lift mechanism, a manual adjusting lever movable with respect to said rock shaft, and yielding means connecting said adjusting lever with said first named rock shaft, whereby actuation of said power lift operates through said manual adjusting means and said yielding connection for raising and lowering said tools.

20. A lister cultivator comprising a generally V-shaped frame having rearwardly diverging frame bars, a transverse draft bar rigidly secured to said frame bars intermediate their ends, a plurality of wheel supported truck frames having soil engaging tools and pivotally connected with said transverse draft bar for lateral swinging movement, equalizing bar means connected with said units for maintaining the latter in upright position, means suspending the rear ends of said frame bars from said equalizing bar means, a ground engaging supporting wheel means journaled for rotation at the forward portion of said generally V-shaped frame, and vertically flexible hitch means operatively connected with the front end of said frame.

21. A lister cultivator comprising a frame including a generally transverse draft bar, a ground supported fore-truck connected with the forward portion of said frame, a plurality of lister gangs pivotally connected with said transverse draft bar for lateral swinging movement, means supporting the rear end of said frame on said gangs, a rock shaft journaled on said transverse draft bar, means connecting each of said gangs with said rock shaft whereby said gangs are raised and lowered by rocking of said rock shaft, and mechanism for rocking said rock shaft.

22. A lister cultivator comprising a frame including generally longitudinally extending frame bars, a transverse draft bar secured thereto, a front supporting wheel mounted at the forward portion of said frame, a plurality of lister gangs pivotally connected to said transverse draft bar, and means supporting the rear portion of said frame on said gangs.

23. A lister cultivator comprising a frame including generally longitudinally extending frame bars, a transverse draft bar secured thereto, a front supporting wheel mounted at the forward portion of said frame, a plurality of lister gangs connected to said transverse draft bar and having earth-engaging tools movable between operative and inoperative positions, said frame being supported at its rear end on said gangs, a rock shaft journaled on said frame, lifting means associated with each of said gangs and connected to said rock shaft, and means for actuating said rock shaft to raise and lower said gangs simultaneously.

24. A lister cultivator comprising a frame including generally longitudinally extending frame bars, a transverse draft bar secured thereto, ground engaging means mounted on the forward portion of said frame for supporting the latter, a plurality of lister gangs, each of said gangs including a truck frame, soil working tools adjustably connected therewith, a forwardly extending draft link connected to said truck frame and pivotally connected at its forward end to said transverse draft bar for lateral swinging movement, and independent ground engaging supporting means, and means for supporting the rear portion of said cultivator frame on said gangs.

25. A lister cultivator comprising a frame including generally longitudinally extending frame bars, a transverse draft bar secured thereto, ground engaging means mounted on the forward portion of said frame for supporting the latter, a plurality of lister gangs, each of said gangs including a truck frame, soil working tools adjustably connected therewith, a forwardly extending draft link connected to said truck frame and pivotally connected at its forward end to said transverse draft bar for lateral swinging movement, and independent ground engaging supporting means adapted for vertical movement relative to said gang for lifting the latter, means for supporting the rear portion of said frame on said gangs, a rock shaft journaled on said cultivator frame, means connecting each of said independent gang supporting means with said rock shaft, and actuating means connected with said rock shaft for rocking the latter to actuate said gang supporting means.

26. A lister cultivator comprising a frame including generally longitudinally extending frame bars converging forwardly, a transverse draft bar secured thereto adjacent the forward end thereof, a plurality of wheel supported cultivator units pivotally connected with said transverse draft bar for lateral swinging movement, said units including soil engaging tools adapted to be raised and lowered, means for raising and lowering said tools including a rock shaft journaled on said frame and links connected between said rock shaft and the soil engaging tools of each unit, adjusting means connected to said rock shaft, and means for supporting the frame comprising a ground engaging wheel journaled for rotation on said frame forwardly of said draft bar, and means supporting the rear portion of said frame on said cultivator units.

27. A lister cultivator comprising a frame, a ground supported fore-truck connected with the forward portion of said frame, a plurality of lister gangs pivotally connected with said frame, means supporting the rear end of said frame on said gangs, and a draft member pivoted to the forward end of said frame.

28. A lister cultivator comprising a frame, a ground supported fore-truck connected with the forward portion of said frame, a plurality of lister gangs pivotally connected with said frame, means supporting the rear end of said frame on said gangs, and a draft member pivotally connected to said frame at laterally spaced points for vertical swinging relative thereto.

29. A lister cultivator comprising a frame, a non-dirigible fore-truck connected to the forward portion of said frame, a plurality of lister gangs pivotally connected to said frame for lateral swinging movement relative thereto, means supporting the rear end of said frame on said gangs, and a U-shaped draft member connected to said frame at laterally spaced points for vertical swinging relative thereto.

30. A lister cultivator comprising a frame, a plurality of cultivator units pivotally connected to said frame for swinging movement relative thereto, said frame extending rearwardly and being supported on said units, and means for supporting the forward portion of said frame comprising a single supporting wheel journaled on said frame substantially on the longitudinal axis thereof, the axis of rotation being fixed relative to the frame.

31. A lister cultivator comprising a frame, a plurality of cultivator units pivotally connected to said frame for swinging movement relative thereto, said frame extending rearwardly and being supported on said units, means for supporting the forward portion of said frame comprising a single supporting wheel journaled on said frame substantially on the longitudinal axis thereof, the axis of rotation being fixed relative to the frame, and a draft member including a pair of laterally spaced arms pivotally connected to said frame at transversely aligned points on opposite sides of said wheel.

32. A lister cultivator comprising a frame, a plurality of cultivator gangs, each of said gangs including a truck frame, soil working tools connected therewith, a draft link connected with said truck frame and pivotally connected to said cultivator frame, and supporting wheels for said gang, said cultivator frame extending rearwardly and being supported on said gangs, means for supporting the forward portion of said cultivator frame comprising a single ground wheel journaled on said frame substantially on the longitudinal center line thereof, and a draft member pivotally connected to said cultivator frame for vertical swinging movement relative thereto.

33. A lister cultivator comprising a frame, a plurality of cultivator gangs, each of said gangs including a truck frame, soil working tools connected therewith, a draft link connected with said truck frame and pivotally connected to said cultivator frame, and supporting wheels for said gang, said cultivator frame extending rearwardly and being supported on said gangs, means for supporting the forward portion of said cultivator frame comprising a single ground wheel journaled on said frame substantially on the longitudinal center line thereof, and a draft member including a pair of laterally spaced arms pivotally connected to said frame at transversely aligned points on opposite sides of said wheel.

34. A lister cultivator comprising a frame including a transversely disposed draft bar, a single supporting wheel journaled on said frame ahead of said bar and disposed substantially centrally thereof, a plurality of lister cultivator gangs pivotally connected at laterally spaced points to said draft bar for lateral and vertical swinging movement relative thereto, and means for supporting the rear portion of said frame on said gangs.

35. A lister cultivator comprising a frame, a single supporting wheel journaled on the forward portion of said frame and substantially centrally thereof, a plurality of cultivator gangs pivotally connected to said frame at laterally spaced points, means supporting the rear end of said frame on said gangs at laterally disposed points on opposite sides of said wheel, and power lift mechanism associated with said wheel for receiving power therefrom and operatively connected to said gangs.

36. A lister cultivator comprising a frame including a transversely disposed draft bar, a single supporting wheel journaled on said frame ahead of said bar and disposed substantially centrally thereof, a plurality of lister cultivator gangs pivotally connected at laterally spaced points to said draft bar for lateral and vertical swinging movement relative thereto, means supporting said frame in rear of said bar on said gangs at laterally disposed points on opposite sides of said wheel and accommodating lateral swinging movement of said gangs, and power lift mechanism associated with said wheel for receiving power therefrom and operatively connected to said gangs.

37. A lister cultivator comprising a frame, a supporting wheel therefor journaled near the forward end of said frame, the axis of rotation of said wheel being fixed relative to said frame, a plurality of cultivator gangs pivotally connected to said frame in laterally spaced relation rearwardly of said wheel, a draft member disposed forwardly of said wheel and pivotally connected to said frame at points on opposite sides of said wheel, and power lift mechanism associated with said wheel for receiving power therefrom and operatively connected with said gangs.

38. A lister cultivator comprising a frame, a plurality of cultivator gangs pivotally connected to said frame in laterally spaced relation, each of said gangs including a ground working tool carrying frame, supporting wheels therefor, and lifting mechanism for raising said tool frame relative to said wheels, a ground engaging supporting wheel for the forward portion of said cultivator frame, the rear portion of said frame being supported on said gangs, power lift actuating mechanism connected to said supporting wheel for receiving power therefrom, and means operatively connecting said actuating mechanism to said lifting mechanism on each of said gangs.

39. A lister cultivator comprising a frame, a plurality of cultivator gangs pivotally connected to said frame in laterally spaced relation, each of said gangs including a ground working tool carrying frame, supporting wheels therefor, and lifting mechanism for raising said tool frame relative to said wheels, a ground engaging supporting wheel for the forward end of said cultivator frame, the rear end of said frame being supported on said gangs, power lift actuating mechanism connected to said supporting wheel for receiving power therefrom, a rock shaft journaled on said cultivator frame and connected to said actuating mechanism, and means operatively connecting said rock shaft with said lifting mechanism on each of said gangs.

40. A lister cultivator comprising a frame, a plurality of cultivator gangs, each gang comprising a ground working tool carrying frame, a draft link connected to said tool frame and pivotally connected to said cultivator frame, crank arms swingably mounted on said tool frame, and ground wheels journaled on said crank arms, a supporting wheel for said cultivator frame, self interrupting clutch mechanism operatively connected to said wheel, a rock shaft journaled on said cultivator frame and connected to said clutch mechanism for receiving power therefrom, and means operatively connecting said rock shaft to the crank arms on each of said gangs, to swing said arms downwardly to raise said tool frames relative to their respective supporting wheels.

41. A lister cultivator comprising a frame including a transverse draft bar, a supporting wheel journaled on said frame substantially midway between the ends of said bar, a self-interrupting clutch mechanism connected to said wheel to receive power therefrom, a rock shaft substantially coextensive with, and journaled on said draft bar, a plurality of lister cultivator gangs, each gang comprising a ground working tool carrying frame, draft means for connecting the latter to said transverse bar, a pair of crank arms swingably mounted on said tool frame, and a carrying wheel journaled on each of said crank arms, and linkage means for connecting said crank arms on each of said gangs with said rock shaft, whereby rocking said rock shaft by means of said clutch mechanism actuates said crank arms to raise each of said gangs relative to its respective carrying wheels.

42. A lister cultivator comprising a frame including generally longitudinally extending frame bars, a transverse draft bar secured thereto, a front supporting wheel mounted at the forward portion of said frame, a plurality of lister gangs connected to said transverse draft bar and each including ground engaging wheel means and listing tool means, means supporting the rear portion of said frame on said gang wheel means, and mechanism reacting against said frame for raising and lowering said listing tool means.

WALTER H. SILVER.